United States Patent
Bendell

[19]

[11] Patent Number: 5,950,711
[45] Date of Patent: Sep. 14, 1999

[54] AIR-CONDITIONING UNIT FOR A MOTOR VEHICLE

[75] Inventor: Ian Bendell, Mönsheim, Germany

[73] Assignee: Behr GmbH & Co, Stuttgart, Germany

[21] Appl. No.: 08/734,601

[22] Filed: Oct. 22, 1996

[30] Foreign Application Priority Data

Oct. 28, 1995 [DE] Germany .............. 195 40 286

[51] Int. Cl.⁶ .............. B60H 3/00; F25B 29/00; F24B 1/06
[52] U.S. Cl. .............. 165/42; 165/65; 165/126; 237/12.3 A
[58] Field of Search .............. 165/204, 42, 65, 165/202, 122, 126; 237/12.3 A

[56] References Cited

U.S. PATENT DOCUMENTS

| | | | |
|---|---|---|---|
| 4,390,124 | 6/1983 | Nilsson | 237/12.3 |
| 4,453,591 | 6/1984 | Fehr | 165/42 |
| 5,243,830 | 9/1993 | Ito et al. | 62/344 |

FOREIGN PATENT DOCUMENTS

| | | |
|---|---|---|
| 2057424 | 5/1971 | France . |
| 2423188 | 12/1975 | Germany . |
| 3 016 679 | 11/1981 | Germany . |
| 3 107 324 | 1/1982 | Germany . |
| 3 229 866 | 2/1984 | Germany . |
| 3 526 518 | 4/1986 | Germany . |
| 4 208 966 | 9/1992 | Germany . |
| 4119474 | 12/1992 | Germany . |

OTHER PUBLICATIONS

Von Gebhard Schweizer und Ingo Putz, "Entwicklungskonzept einer Euro–Klimananlage," Automobiltecnische Zeitschrift 93 (1991) Oct., pp. 614–616.

Primary Examiner—James C. Yeung
Assistant Examiner—Lance Chandler
Attorney, Agent, or Firm—Foley & Lardner

[57] ABSTRACT

An air-conditioning unit for a motor vehicle comprises a housing having arranged therein, a blower, an evaporator of a cooling unit, and a heater heat exchanger. The evaporator and the heater heat exchanger are arranged downstream of the housing in terms of the airstream, and a plurality of discharge connection stubs which are arranged downstream of the heater heat exchanger are provided in the housing. In order to achieve the smallest possible space requirement and to subject the air channeling to the smallest possible changes in direction, the evaporator and the heater heat exchanger are arranged in the housing in the form of a V with respect to one another, such that respective ends thereof rest closely together in the vicinity of an initial section of the blower spiral.

32 Claims, 3 Drawing Sheets

AIR-CONDITIONING UNIT FOR A MOTOR VEHICLE

FIELD OF THE INVENTION

1. Background of the Invention

The present invention relates to an air-conditioning unit for a motor vehicle and more particularly to such a unit that includes a housing having arranged therein, a blower, an evaporator of a cooling unit, and a heater heat exchanger. The evaporator and the heater heat exchanger are arranged downstream of the housing in terms of the airstream, and a plurality of discharge connection stubs which are arranged downstream of the heater heat exchanger are provided in the housing.

2. Description of Related Art

DE 30 16 679 describes an air-conditioning unit for a motor vehicle, wherein a blower, an evaporator and a heater heat exchanger are arranged in a housing. The pressure side of the blower is adjoined first of all by the evaporator, which is provided with a bypass, it being possible for the airstream which acts on the evaporator to be determined by means of a control flap. The evaporator is adjoined in the air-flow direction by an air duct which leads directly to discharge connection stubs, to which air ducts to various outflow nozzles in the interior of the motor vehicle are connected. Located parallel to the air duct oriented directly in the direction of the discharge connection stubs is a heater heat exchanger with a bypass and airstream control elements by means of which it is possible to determine the proportion of the air which is to be heated and the proportion of the airstream directed through the bypass.

The known air-conditioning unit offers a multitude of different possible settings and, moreover, permits the direct feed of fresh air to the discharge connection stubs of the housing, with the result that the airstream is channeled through the evaporator only if cooling is required. The spatial position of the evaporator and of the heater heat exchanger and of the bypasses and air ducts with the diverse airstream control elements means that, in particular during heating operation, it is often necessary to deflect the flow, and this results in output losses. The blower and the heat exchangers thus have to be designed correspondingly for higher output. Moreover, the known air-conditioning unit requires a considerable amount of space, which is not available in small cars and vehicles at the lower end of the mid-size range.

DE 35 26 518 describes an air-conditioning unit for a motor vehicle, a radial blower being arranged in a first housing, and an evaporator, a heater heat exchanger and a plurality of flaps for airstream control being arranged in a second housing. In terms of its discharge connection stubs on the second housing, the known arrangement is of a space-saving design, but the air channeling within the housing is subjected to considerable changes in direction, in particular when flow takes place through both heat exchangers, and this is ultimately detrimental to the output. In addition, such a unit requires a corresponding amount of space beneath the hood, but such an amount of space is not available in many small cars and vehicles at the lower end of the mid-size range.

SUMMARY OF THE INVENTION

One object of the present invention is to provide an improved air-conditioning unit for a motor vehicle. A particular object of the invention is to provide an air-conditioning unit requiring an amount of space as small as possible and in which the airflow is subjected to as few changes in direction as possible.

In accompanying the foregoing objects, there has been provided according to the present invention an air-conditioning unit for a motor vehicle comprising a housing; arranged in the housing an evaporator of a cooling unit, a heater heat exchange, and a blower comprising at least one radial impeller which rotates in a blower spiral, the evaporator and the heater heat exchanger being arranged downstream of the blower in terms of airstream flow; and a plurality of discharge connection stubs arranged in the housing downstream of the heater heat exchange for air which is to be fed to the vehicle interior. The heater heat exchanger and the evaporator are arranged in the housing in the form of a V with respect to one another, such that they rest closely together at one of their respective ends, and wherein the ends resting together are located in the vicinity of an initial section of the blower spiral.

The essential advantages of the invention are that the heat exchangers, which are arranged closely one behind the other and form a V-shape, and the position of the blower on that side of the heat exchangers which forms the bottom point of the V-shape, provide an extremely compact design, and the air channeling is subjected only to small changes in direction.

Further objects, features and advantages of the invention will become apparent from the detailed description of the preferred embodiments that follows, when considered together with the attached figures of drawing.

BRIEF DESCRIPTION OF THE DRAWINGS

Exemplary embodiments of the invention are explained in more detail hereinbelow with reference to the drawing, in which.

DETAILED DESCRIPTION OF PREFERRED EMBODIMENTS

Figure 1:
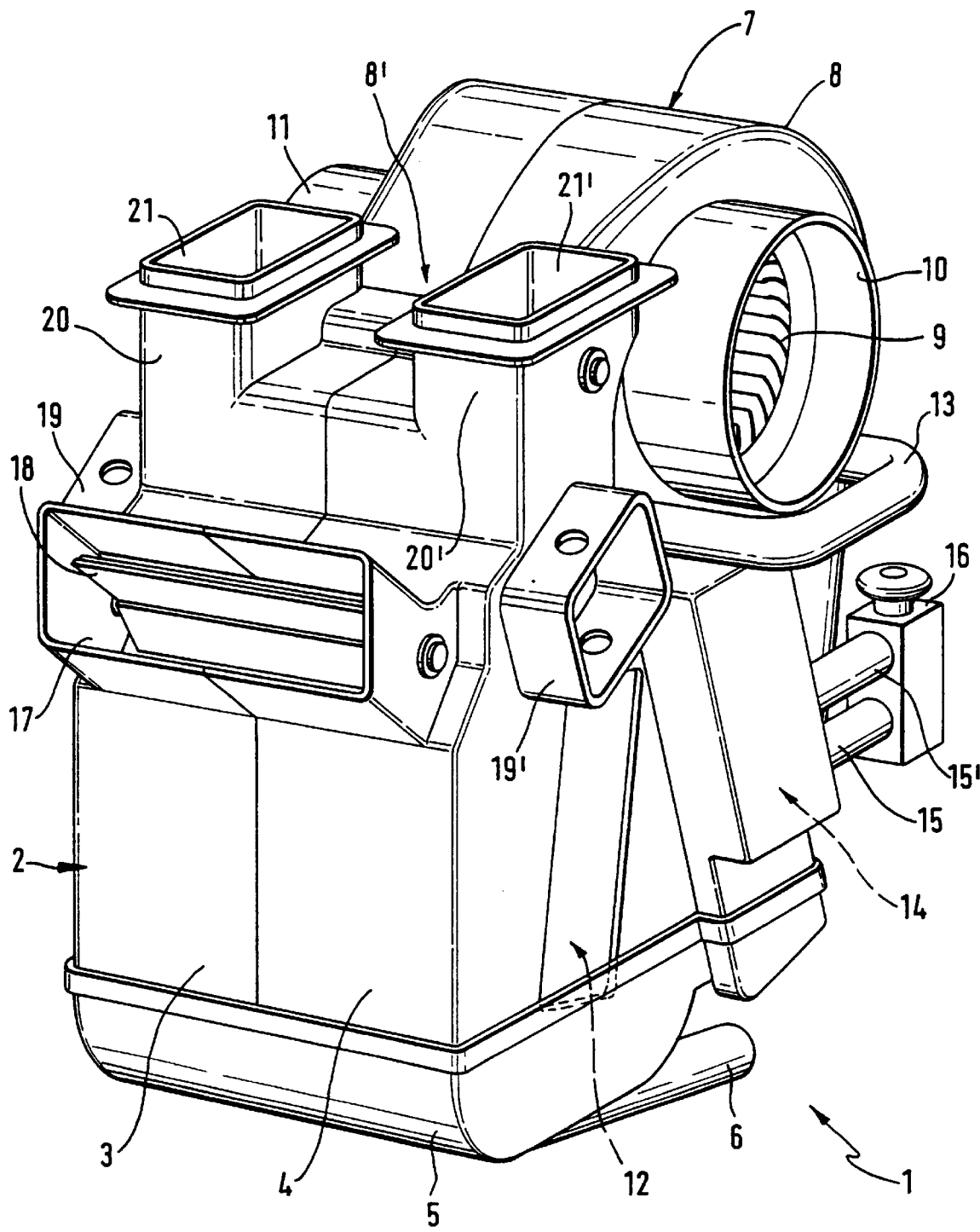
FIG. 1 is a perspective illustration of an air-conditioning unit according to the invention.

According to a preferred configuration of the invention, the evaporator has an end surface upon which the airstream acts and which runs at an angle of approximately 15° to 20° with respect to the direction of the airstream passing out of the blower spiral. In the case of a planar contour of the housing adjoining the blower spiral, this position of the evaporator forms a gradually tapering air duct between the housing wall and the evaporator. The heater heat exchanger has an end surface which runs at an angle of approximately 20° to 30°, preferably 23°, with respect to the end surface of the evaporator. This angle of the end surfaces of the two heat exchangers with respect to one another forms, in the direction of the open end of the V-shape, a sufficiently large space in which the air passing out of the evaporator can be divided, depending on the heating requirement, between an airstream channeled through the heating device and an airstream channeled through the bypass. In this arrangement, the outer dimensions of the two heat exchangers at the open end of the V-shape correspond approximately to the diameter of the blower spiral orthogonal to the outflow direction.

A preferred embodiment or feature of the invention consists in that a bypass duct which can be closed by means of an airstream control flap is formed on that side of the heater heat exchanger which is remote from the blower. This position of the bypass duct means that the path for the cold air is somewhat longer than the path of the airstream directed through the heater heat exchanger, the so-called warm air. The advantage of this arrangement is that the flow resistance of the heater heat exchanger is compensated at least partially by the longer flow path of the cold air.

In a particularly preferred configuration, an inner housing which is provided with at least one air-inlet opening and at least one air-outlet opening is provided in the housing. The heater heat exchanger is arranged in said inner housing, as a result of which, apart from the air-inlet and air-outlet openings, the heater heat exchanger is encapsulated. This means that the cold air flowing through the bypass duct is not subjected to heating, contrary to intentions, by the heat radiation of the heater heat exchanger. A wall section of the inner housing runs between the ends at which the evaporator and the heater heat exchanger rest against one another. However, these ends are spaced apart from one another only by the thickness of the material of the inner housing.

It is regarded as particularly expedient that the bypass duct is formed between the inner wall of the housing and the outer wall of the inner housing, and at least one section of the bypass duct runs virtually parallel to the end side of the heat exchanger. In this manner, the walls of the housing parts simultaneously form the bypass duct, and a narrow design of the housing is achieved by the section running parallel to the end surface. Since the bypass duct is routed past that side of the heater heat exchanger which is remote from the blower, a bend of approximately 90° is located upstream of the parallel section of the bypass duct. As a result of the wall parts of the housing and of the inner housing running in parallel, the cross section of the bypass duct is virtually constant over its entire length. It is particularly expedient to arrange the airstream control flap in the bend of the bypass duct, the flap body being designed so as to be curved around its pivot axis. In this manner, when it is in the open state, the airstream control flap is located in a position which corresponds to the curved contour of the housing and of the inner housing. This favorably influences the airflow through the bends of the bypass duct. In order to control the airstream proportion of the warm air, the amount of air directed through the heater heat exchanger is preferably set by means of an airstream control flap which is mounted pivotably in the region of the air-inlet opening.

In a preferred configuration, the housing is formed by two housing parts which fit against one another along a central joint and between which the radial impeller, the evaporator and heater heat exchanger are arranged. In order that the base region does not have any joint through which condensation water, which may possibly be deposited on the evaporator and drip onto the base of the housing, can escape from the housing, it is advantageous that the base region of the housing is formed by a housing shell, which extends beneath the evaporator. The condensation water which is deposited in the evaporator collects in this housing shell and is discharged, for example, through a run-off connection stub.

In order further to reduce the amount of space required, it is, moreover, advantageous to arrange a section of the blower spiral between connection tubes of the heater heat exchanger. In this arrangement, it is particularly expedient that, on its side located in the immediate vicinity of the blower spiral, the heater heat exchanger has a water tank which is provided with receiving connection stubs which are located to the side of the section of the blower spiral and are intended for the connection tubes. In this manner, the free spaces which are obtained due to the configuration of the spiral housing can be used for the arrangement of connection tubes and receiving connection stubs. Air ducts of the housing which lead to discharge connection stubs may likewise be arranged in this region.

The air ducts preferably extend at least virtually in the same direction as that section of the bypass duct which runs parallel to the heater heat exchanger. This achieves a preferred airflow to the air ducts, without a change in direction, with the result that there is no need for any deflecting or directing means to be provided. In order that this preferred airflow can be used for window defrosting, which is important in terms of traffic safety, provision should be made for the discharge connection stubs on the air ducts for the defrosting of the windshield.

The air-inlet opening is expediently arranged in a region of the inner housing which is remote from the blower, and the air-outlet opening (in terms of the direction in which the air flows through the heater heat exchanger) is arranged in a manner diagonally offset with respect to the air-inlet opening. This diagonally offset arrangement of the air-inlet opening and air-outlet opening makes it possible for the end surface of the heater heat exchanger to be acted upon so as to achieve a uniform temperature profile, although the cross sections of the air-inlet opening and air-outlet opening are considerably smaller than the end surface of the heat-exchanger network.

In order that, when the air-inlet opening of the inner housing is blocked off, the air flowing through the bypass is prevented from passing into the inner housing through the air-outlet opening and taking up heat energy from the heater heat exchanger, directing or guide elements are provided in the air-outlet opening and run at least virtually transversely with respect to the direction of the adjacent section of the bypass duct. Furthermore, these directing or guide elements act such that, when the air-inlet opening of the inner housing is open, the warm air passes out at the air-outlet opening essentially transversely with respect to the air-flow direction of the cold air channeled in the bypass duct. This effects, in part, mixing of the warm and cold air and, in part, a displacement of the warm air in the direction of the discharge connection stubs which are connected to the outflow nozzles for the footwell or window defrosting.

As the heat requirement increases, the proportion of air flowing through the heater heat exchanger is to be increased and, accordingly, the proportion of cold air flowing through the bypass duct is to be reduced. In order to bring about, in a simple manner, a corresponding interdependence in the influencing of the airstreams, it is advantageous that the airstream control flap in the air-inlet opening and the airstream control flap in the bypass duct are coupled mechanically, such that an increase in the airstream through the air-inlet opening results in a reduction in the airstream through the bypass and vice versa. In order to keep the velocities of flow as constant as possible throughout the unit and not to render them dependent on the respective airstream proportions of warm air and cold air, it is advantageous that the air-inlet opening, the air-outlet opening and the bypass duct have at least virtually the same cross sections.

FIG. 1 shows an air-conditioning unit 1 having a housing comprising two housing parts 3 and 4, which fit against one another along a central joint, and a housing shell 5, which closes off the housing 2 at the bottom. Provided on the housing shell 5 is a run-off connection stub 6 for discharging the condensation dripping into the housing shell 5.

Located in the upper region of the housing 2 is a blower 7 with a radial impeller 9 which rotates in a blower spiral 8 and is driven by a drive motor 11. Arranged on that side of the blower spiral 8 which is located opposite the drive motor 11 is an intake connection stub 10 for fresh air or circulating air extracted from the vehicle interior. A heater heat exchanger 12, to which the heating medium is channeled through connection tubes 13, is arranged beneath the blower 7, in the housing 2, between the housing parts 3 and 4. An evaporator 14 of a compression cooling unit is arranged adjacent to the heater heat exchanger 12, beneath the blower 7 and is connected to an expansion valve 16 by means of coolant connection tubes 15, 15'.

Provided on the housing 2 is a discharge connection stub 17 to which it is possible to connect an air-channeling duct which channels the air to outflow nozzles located in the dashboard of the motor vehicle. The discharge connection stub 17 can be closed by means of a rotatably mounted flap 18. Arranged to the side of the discharge connection stub 17 are in each case discharge connection stubs 19, 19' to which it is possible to connect air-channeling ducts to the footwell nozzles. Extending above the discharge connection stubs 17, 19, 19', in each of the housing parts 3 and 4, is an air duct 20, 20' which runs alongside a section 8' of the blower spiral 8. Arranged at the upper ends of the air ducts 20, 20' are discharge connection stubs 21, 21' to which it is possible to connect air-channeling ducts which lead to defroster nozzles beneath the windshield of the motor vehicle.

Figure 2:
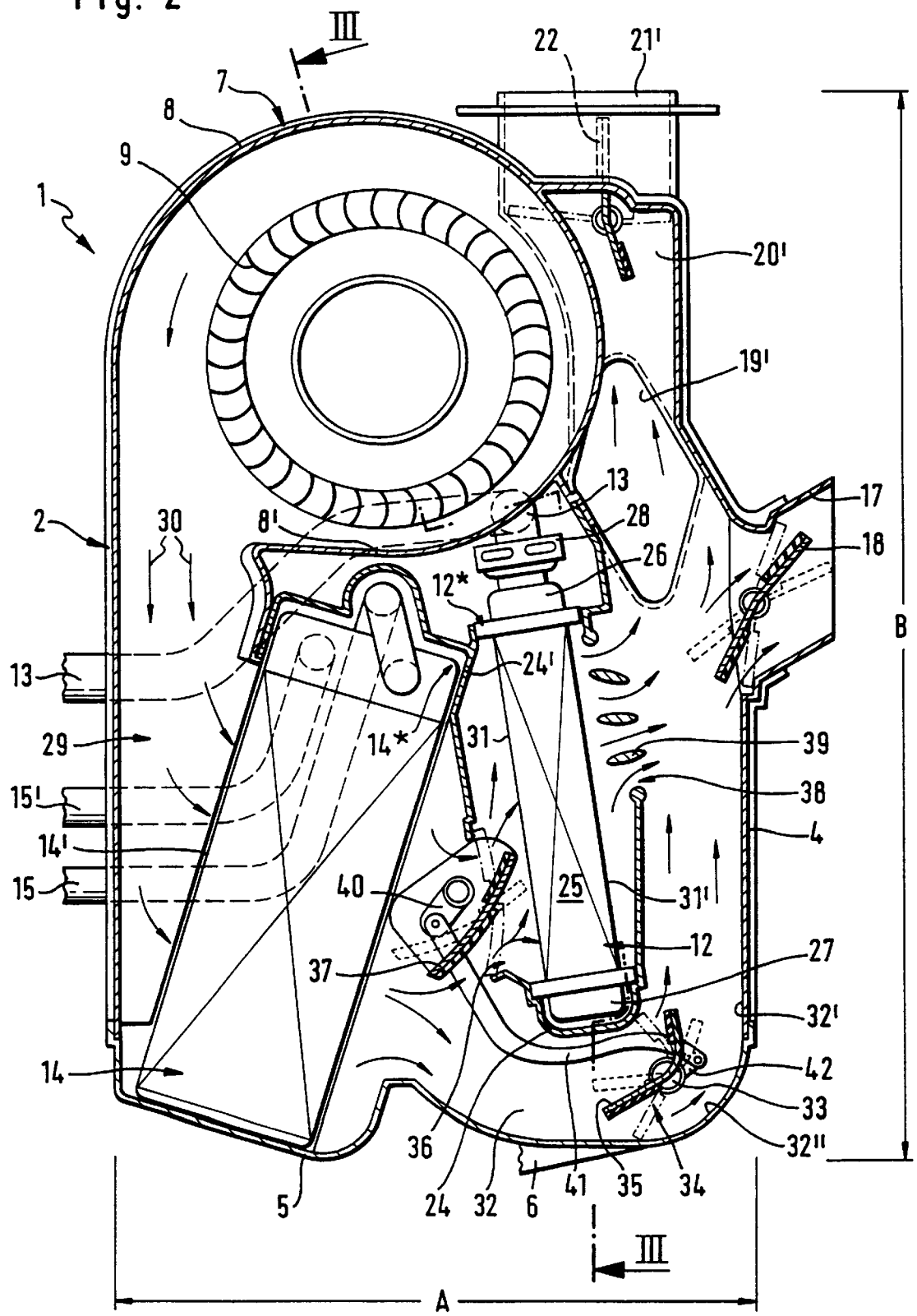
FIG. 2 is a longitudinal section through the air-conditioning unit in FIG. 1.

In the longitudinal section through the air-conditioning unit 1 which is shown in FIG. 2, the blower 7 with a radial impeller 9 is arranged in an upper part of the housing 2. The upper part of the housing 2 is configured as a blower spiral 8, which is designed in one piece with the housing 2. The lower part of the housing 2 is formed by a housing shell 5. Formed beneath the blower 7 in the housing 2 is a space 29 into which the airstream produced by the blower 7 passes. The airstream which passes out of the blower spiral 8 is indicated by directional arrows 30. The evaporator 14, to which the coolant lines 15 and 15' are connected, is located in the space 29.

Located within the housing 2 is an inner housing 24 which extends from the initial section 8' of the blower spiral 8 in the direction of the lower shell 5 of the housing 2. The heater heat exchanger 12 is arranged in the inner housing 24 and comprises a heat-exchanger network 25, and an upper water tank 26 and a lower water tank 27. By way of the upper water tank 26, the heater heat exchanger 12 is located in the immediate vicinity of the spiral housing 8 or of the initial section 8' thereof. Located on the upper water tank 26 are receiving connection stubs 28 for receiving and fastening the connection tubes 13 through which the heating medium is fed to the heater heat exchanger 12.

The evaporator 14, which is located upstream of the heater heat exchanger 12 in the air-flow direction, is arranged, by means of its end side 14', at an angle of approximately 15° to 20° with respect to the direction of the air 30 passing out of the blower spiral 8, with the upper end of the evaporator 14 being inclined toward the heater heat exchanger 12 and resting against the inner housing 24. By virtue of a corresponding configuration of the upper region 24' of the inner housing 24, the upper ends 14* and 12* of the heat exchangers (evaporator 14 and heater heat exchanger 12) rest against one another so as to be spaced apart only by the wall thickness of a wall section 24' of the inner housing 24. Depending on the installation position of the heater heat exchanger 12, the front end surface 31 of the heat-exchanger network 25 is arranged at an angle of approximately 7° with respect to the direction of the airstream 30 passing out of the blower spiral 8. The evaporator 14 and the heater heat exchanger 12 are thus arranged in the form of a V with respect to one another, the end surfaces 14' and 31 forming an angle of approximately 20° to 30°; the angle is 23° in the exemplary embodiment illustrated.

A bypass duct 32 is formed between the inner housing 24 and the lower housing shell 5 and the housing part 4. The wall of the inner housing 24 and the wall of the housing part 4 and of the housing shell 5 run at least essentially parallel to one another. The bypass 32 first of all runs through beneath the lower water tank 27 of the heater heat exchanger 12 and then passes into a bend 32" which is, finally, adjoined by a section 32' which runs essentially parallel to the outlet-side end surface 31' of the heater heat exchanger 12.

An airstream control flap 34 which can be rotated around a pivot axis 33 and whose flap body 35 is designed so as to be curved around the pivot axis 33 is arranged in the bend 32" of the bypass duct 32. The airstream control flap 34 can be used to either set the proportion of cold air coming from the evaporator 12 and flowing through the bypass duct 32 or to close the bypass duct completely. In the other end position of the airstream control flap 34, the bypass duct 32 is open to the full extent, with the flap body 35 assuming a position in which its contour runs parallel to the wall parts of the bend 32". This measure permits the airflow through the bypass duct 32 to be influenced favorably.

In the lower region, that is to say the region which is remote from the blower 7, the inner housing 24 has, on the side facing the evaporator 14, an air-inlet opening 36 which can be closed by means of a pivotably mounted airstream control flap 37. Provided in the inner housing 24 on the other side of the heater heat exchanger 12 is an air-outlet opening 38 which, in relation to the heater heat exchanger 12, is arranged diagonally with respect to the air-inlet opening 36. This offset arrangement of the air-inlet opening 36 and of the air-outlet opening 38 results in the end surface 31 of the heat-exchanger network 25 being acted upon in as uniform a manner as possible, with the result that a uniform temperature profile is achieved. Arranged in the air-outlet opening 38 are air-directing elements 39 which are aligned essentially transversely with respect to the section 32' of the bypass duct 32. These directing elements 39 mean that the warm airstream leaving the heater heat exchanger 12 comes into contact essentially transversely with the cold airstream channeled through the section 32', and intensive mixing thus takes place.

Fastened on the airstream control flap 37 is a lever 40 on which a linkage (or alternatively a Bowden cable—not illustrated in the drawing) is articulated for the purpose of actuating the flap. This lever 40 is connected to a lever 42 of the flap 34 by a linkage 41, with the result that the two flaps 37 and 34 are actuated at the same time. The function of the flaps 37 and 34 here is such that, when the airstream control flap 37 is moved so as to close the air-inlet opening 36, the airstream control flap 34 is moved in an opposing manner, namely, so as to open the bypass duct 32, and vice versa.

Provided in the wall of the housing 2 or housing part 4 is the discharge connection stub 17, in which pivotably mounted flap 18 is arranged. An air duct which leads to outflow nozzles in the dashboard is connected to the discharge connection stub 17. As is clear from FIG. 2, the discharge disconnection stub 17 is located obliquely with respect to the air-outlet opening 38 of the inner housing 24. The air ducts 20' adjoin as an extension of the section 32' of the bypass duct 32, it being possible to see only one of the air ducts 20' from the illustration in FIG. 1. Provided at the beginning of air duct 20' is the discharge connection stub 19' which continues at right angles from said air duct and to which it is possible to connect an air-channeling duct for the footwell nozzles. The air duct 20' extends along the section 8' of the blower spiral 8, the air duct 20' being designed at its upper end as a discharge connection stub 21'. The discharge connection stub 21' serves for the connection of an air-channeling duct which leads to defroster nozzles beneath the windshield and runs approximately flush with that part of the blower spiral 8 which is outermost in this direction of the housing 2. A block-off flap 22 is arranged in the air duct 20', upstream of the discharge connection stub 21'.

Figure 3:
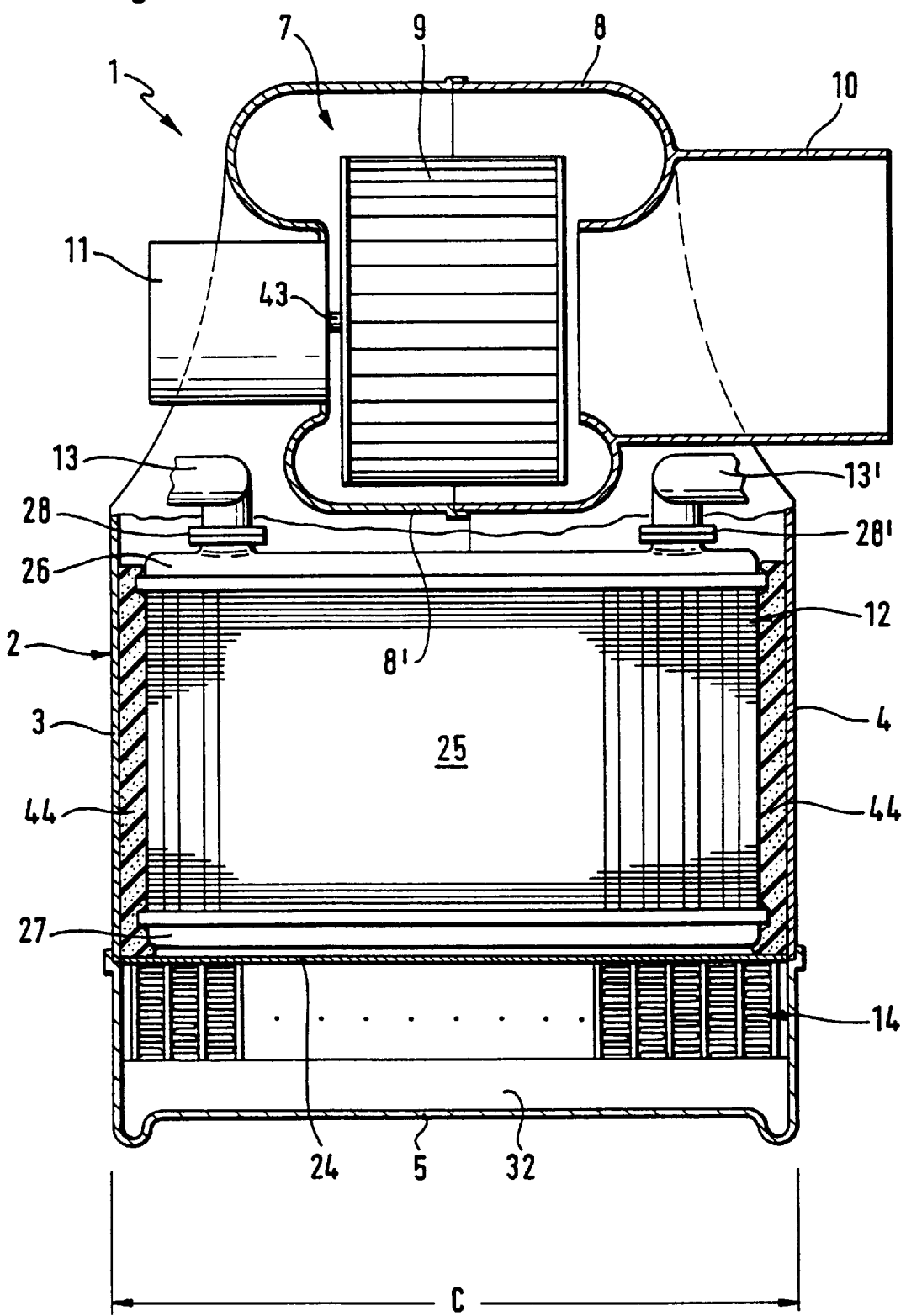
FIG. 3 is a cross-section along line III—III in FIG. 2.

FIG. 3 shows a section along line III—III in FIG. 2. It is clear from this illustration that the initial region 8' of the blower spiral 8 is located between the receiving connection stubs 28, 28' on the upper water tank 26 of the heater heat exchanger 12 and between the connection tubes 13 and 13'. The diffuser-like contour of the blower spiral 8 reaches as far as the beginning of the straight and parallel wall parts of the housing 2, or housing parts 3 and 4, which is closed off at its lower end by means of the housing shell 5. In order to avoid an unintended flow of air past the heat-exchanger network, the lateral borders of the heat-exchanger network 25 are sealed with respect to the wall of the housing parts 3, 4 by means of a seal 44. By way of the lower water tank 27, the heater heat exchanger 12 rests on the inner housing 24 in a sealing manner. The bypass duct 32, through which a section of the evaporator 14 can be seen, is formed between the wall of the inner housing 24 and the lower housing shell 5 of the housing 2. The radial impeller 9 is located in the blower spiral 8 and is fastened on a shaft 43 of the drive motor 11. The intake connection stub 10 is integrally formed at that end of the spiral housing 8 which is located opposite the drive motor 11. Fresh air and/or circulating air which is extracted from the vehicle interior is taken in through the intake connection stub.

The air-conditioning unit shown in the exemplary embodiments of FIGS. 1 to 3 comprises a heater heat exchanger 12 which is controlled in terms of the airstream. However, it is possible in a simple manner to provide, instead of the airstream control flap 37 or else in addition to this, a water valve on the connection tube 13, by means of which the flow of the heating medium through the heater heat exchanger 12 can be controlled. The invention provides an air-conditioning unit which can also be used when there is only a small amount of space available. Thus, for example, the corresponding dimensions A, B, C specified in FIGS. 2 and 3 may be A≦220 mm B≦400 mm C≦235 mm.

The entire disclosure of German Patent Application No. 195 40 286.3, filed Oct. 28, 1995, is hereby incorporated by reference.

Although the present invention has been described and illustrated with reference to a limited number of preferred embodiments, it is to be understood that the invention can also be embodied in other designs of alternate configuration. The appended claims are intended to cover all such alternative designs of the invention.

What is claimed is:

1. An air-conditioning unit for a motor vehicle, comprising: a housing; arranged in the housing an evaporator of a cooling unit, a heater heat exchanger, and a blower comprising at least one radial impeller which rotates in a blower spiral, the evaporator and the heater heat exchanger being arranged downstream of the blower in terms of airstream flow; and a plurality of discharge connection stubs arranged on the housing downstream of the heater heat exchanger for air which is to be fed to the vehicle interior, wherein the heater heat exchanger and the evaporator are arranged in the housing in the form of a V with respect to one another, such that they rest closely together at one of their respective ends, and wherein the ends resting together are located in the vicinity of an initial section of the blower spiral.

2. An air-conditioning unit as claimed in claim 1, wherein the evaporator has a frontal surface upon which the airstream acts and which runs at an angle of approximately 15° to 20° with respect to the direction of the airstream passing out of the blower spiral.

3. An air-conditioning unit as claimed in claim 2, wherein the heater heat exchanger has a frontal surface which runs at an angle of approximately 20° to 30° with respect to said frontal surface of the evaporator.

4. An air-conditioning unit as claimed in claim 1, further comprising a bypass duct formed on that side of the heater heat exchanger remote from the blower, and an airstream control flap positioned in said bypass duct.

5. An air-conditioning unit as claimed in claim 4, further comprising an inner housing having at least one air-inlet opening and at least one air-outlet opening, wherein the heater heat exchanger is arranged in the inner housing.

6. An air-conditioning unit as claimed in claim 5, wherein a wall section of the inner housing runs between the ends of the heater heat exchanger and of the evaporator that rest closely together.

7. An air-conditioning unit as claimed in claim 5, wherein the bypass duct is formed between the inner wall of the housing and the outer wall of the inner housing, and at least one section of the bypass duct runs essentially parallel to the frontal surface of the heater heat exchanger.

8. An air-conditioning unit as claimed in claim 7, further comprising a bend of approximately 90° upstream of said parallel section of the bypass duct.

9. An air-conditioning unit as claimed in claim 8, wherein the airstream control flap is arranged in the bend, and the flap body is designed so as to be curved around its pivot axis.

10. An air-conditioning unit as claimed in claim 5, further comprising a pivotably mounted airstream control flap in the region of the air-inlet opening in said inner housing and a linkage mechanism for closing said pivotable airstream control flap in response to adjustment of said airstream control flap in said bypass duct.

11. An air-conditioning unit as claimed in claim 1, wherein the housing comprises two housing parts which fit against one another along a central joint and between which the radial impeller, the evaporator and the heater heat exchanger are arranged, and said unit further comprises a housing shell, which extends beneath the evaporator.

12. An air-conditioning unit as claimed in claim 1, wherein said initial section of the blower spiral is arranged between connection tubes of the heater heat exchanger.

13. An air-conditioning unit as claimed in claim 12, wherein, on its side located in the immediate vicinity of the blower spiral, the heater heat exchanger comprises a water tank which is provided with receiving connection stubs which are located to the side of the initial section of the blower spiral and are for the connection tubes of the heater heat exchanger.

14. An air-conditioning unit as claimed in claim 1, wherein said initial section of the blower spiral is arranged between air ducts of the housing which lead to discharge connection stubs.

15. An air-conditioning unit as claimed in claim 14, wherein the air ducts extend at least essentially in the same direction as said parallel section of the bypass duct.

16. An air-conditioning unit as claimed in claim 15, wherein the discharge connection stubs on said air ducts are adapted for defrosting of a windshield, and these discharge connection stubs further comprise flaps for selectively closing the discharge connecting stubs.

17. An air-conditioning unit as claimed in claim 5, wherein the air-inlet opening in the inner housing is arranged in a region of the inner housing which is remote from the blower, and the air-outlet opening in the inner housing is arranged in a manner diagonally offset, in terms of the direction in which the air flows through the heater heat exchanger with respect to the air-inlet opening.

18. An air-conditioning unit as claimed in claim 5, further comprising air-directing elements located in the air-outlet opening of said inner housing and arranged so as to cause the air to pass out of the inner housing essentially transversely with respect to air flowing in the parallel section of the bypass duct.

19. An air-conditioning unit as claimed in claim 10, wherein the airstream control flap in the air-inlet opening and the airstream control flap in the bypass duct are coupled mechanically such that an increase in the airstream through the air-inlet opening results in a reduction in the airstream through the bypass and vice versa.

20. An air-conditioning unit as claimed in claim 5, wherein the air-inlet opening in the inner housing, the air-outlet opening in the inner housing and the bypass duct have at least essentially equivalent cross sections.

21. An air conditioning unit as claimed in claim 1, wherein said ends resting together lie substantially adjacent to an initial section of said blower spiral.

22. An air conditioning unit as claimed in claim 1, wherein an upper water tank of said heater heat exchanger is adjacent to said blower spiral.

23. An air conditioning unit as claimed in claim 1, wherein a point of said V points substantially toward a center of said blower spiral.

24. An air conditioning unit as claimed in claim 1, wherein the respective ends of said heat exchanger and said evaporator are substantially adjacent to one another.

25. An air conditioning unit for a motor vehicle, comprising:

a housing;

a blower located in an upper region of said housing and having an outer housing;

an evaporator arranged in said housing downstream from said blower;

a heater heat exchanger downstream from said evaporator; and a plurality of discharge stubs located downstream from said evaporator and heater heat exchanger, wherein an upper end of said evaporator is inclined toward said heater heat exchanger and forms a substantially V-shaped configuration therewith; and wherein said upper end of said evaporator and an upper end of said heater heat exchanger are positioned substantially adjacent one another and substantially directly adjacent to the outer housing of said blower.

26. An air conditioning unit for a motor vehicle as claimed in claim 25, wherein an upper water tank of said heater heat exchanger lies substantially adjacent to said upper region of said housing that houses said blower.

27. An air conditioning unit for a motor vehicle as claimed in claim 25, wherein an angle defined by a surface of said upper end of said evaporator and a surface of said upper end of said heater heat exchanger is between 20 and 30 degrees.

28. An air conditioning unit for a motor vehicle as claimed in claim 25, further comprising a bypass duct between said inner housing and a lower housing portion of said housing.

29. An air condition unit for a motor vehicle as claimed in claim 28, further comprising a first airstream control flap in said bypass duct.

30. An air conditioning unit for a motor vehicle as claimed in claim 29, wherein said inner housing includes a second airstream control flap.

31. An air conditioning unit as claimed in claim 30, wherein said first and second airstream control flaps are connected.

32. An air conditioning unit as claimed in claim 25, wherein the upper end of said evaporator rests against an inner housing, and wherein the upper ends of said evaporator and said heater heat exchanger are separated essentially only by the wall thickness of said inner housing.

* * * * *